Nov. 10, 1964  J. EGGER  3,156,086
EPOXY JOINED WATCH CASE
Filed Sept. 15, 1961  3 Sheets-Sheet 1
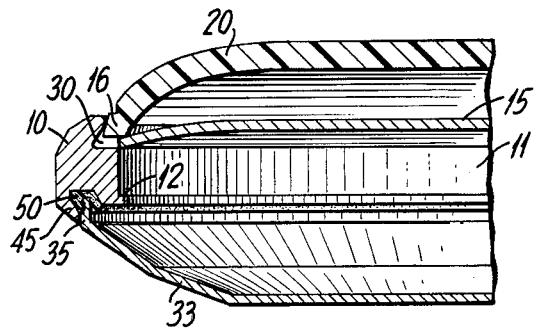
FIG. 1
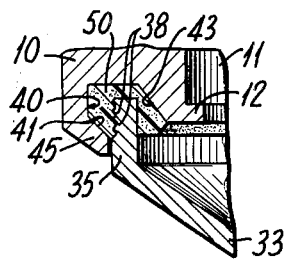 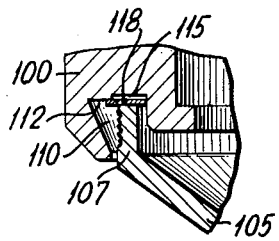
FIG. 2  FIG. 3
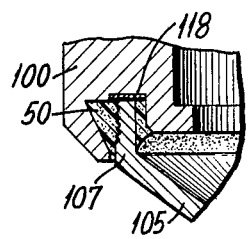
FIG. 4
INVENTOR.
JOSEF EGGER
BY
Davis, Hoxie, Faithfull & Hapgood
ATTORNEYS.

Nov. 10, 1964   J. EGGER   3,156,086
EPOXY JOINED WATCH CASE
Filed Sept. 15, 1961   3 Sheets-Sheet 2
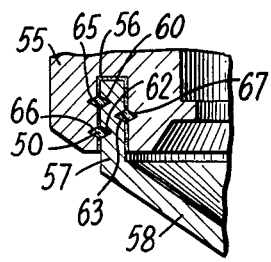
FIG. 5
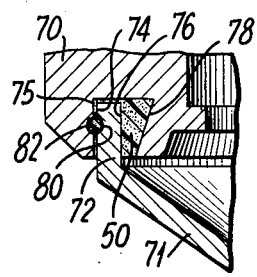   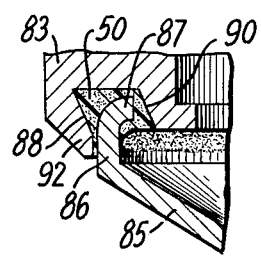
FIG. 6   FIG. 7
INVENTOR.
JOSEF EGGER
BY
Davis, Hoxie, Faithfull & Hapgood
ATTORNEYS.

United States Patent Office 3,156,086
Patented Nov. 10, 1964

3,156,086
EPOXY JOINED WATCH CASE
Josef Egger, Pforzheim, Germany, assignor to The United States Time Corporation, Waterbury, Conn., a corporation of Connecticut
Filed Sept. 15, 1961, Ser. No. 138,445
Claims priority, application Germany Sept. 22, 1960
2 Claims. (Cl. 58—88)

The present invention relates to watches and particularly to a watch sub-assembly comprising a joined watch back and bezel.

Desirably the joint between the bezel and the watch back should be waterproof, resistant to shock, durable and strong, and should hold the two tightly together even when subjected to chemical action, moisture, and wear. Presently, the back and the bezel are often soldered together to attain these results; however, soldering is relatively expensive, sometimes fails, and sometimes discolors or deforms the watch. Failure of a soldered joint often occurs because the bezel is of a different metal than the back, so that the metals have different hardnesses and different melting points. Discoloration and deformation occur, in the course of wear, because during the soldering process, heat is applied causing tensions in the metal back and the bezel. Another method of joining the back and bezel is to press-fit them together. However, this requires great accuracy in producing the parts resulting in high costs, and it requires the use of gaskets to make the watch waterproof.

Problems arising from joining the back and bezel may be avoided by manufacturing them from a single metal piece. This is expensive, however, because the back, which should be resistant to perspiration, uses relatively expensive metals such as gold plated steel or stainless steel and the bezel would also have to be made of the same expensive material, and also because machining or casting such a part is relatively expensive due to its shape.

The objectives of the present invention are to provide a method of joining a watch back to a bezel which is simple and inexpensive; to provide a joined watch back and bezel sub-assembly which is waterproof, durable and inexpensive; and to provide a back and bezel sub-assembly whose joint is electrically insulative, so that either the back or the bezel may be electrochemically treated without affecting the other part.

In accordance with the present invention epoxy material, either in the liquid or the paste form, fills a groove about the back open portion of a bezel. A watch back having a protruding flange is pressed into the groove and the excess epoxy material wiped off. The material is then hardened, preferably under heat and preferably with the use of pressure on the watch back. It is not necessary to manufacture either the groove or the protruding flange of the watch back with high accuracy as the epoxy material fills up the spaces.

In accordance with another aspect of the invention, the bezel or the watch back is electrochemically treated, such as electroplating or electroforming, by touching either the back or the bezel with an electrical conducting rod. The touched portion will then become either the anode or cathode in the electrochemical bath and will be treated, while the untouched portion, which is insulated by the epoxy material, will not be affected.

In accordance with still another aspect of the present invention, an insulating gasket is pressed into a notch in the groove of the bezel as a shoulder to insulate the flange of the watch back from the bezel.

Other objectives of the present invention will be apparent from the following detailed description of certain preferred embodiments, taken in conjunction with the attached drawings, in which:

FIG. 1 is a partial cross-sectional side view through a watch case manufactured in accordance with the present invention;

FIG. 2 is an enlarged partial section of a portion of the watch case of FIG. 1;

FIG. 3 is an enlarged partial section as in FIG. 2 and showing another embodiment of the joining of the watch back to the bezel;

FIG. 4 is an enlarged partial cross-section drawing embodiment of the joining of the watch back to the bezel in which the back is brought into its final position;

FIGS. 5, 6 and 7 are likewise enlarged partial cross-sections showing various other embodiments of the present invention.

Figure 8:
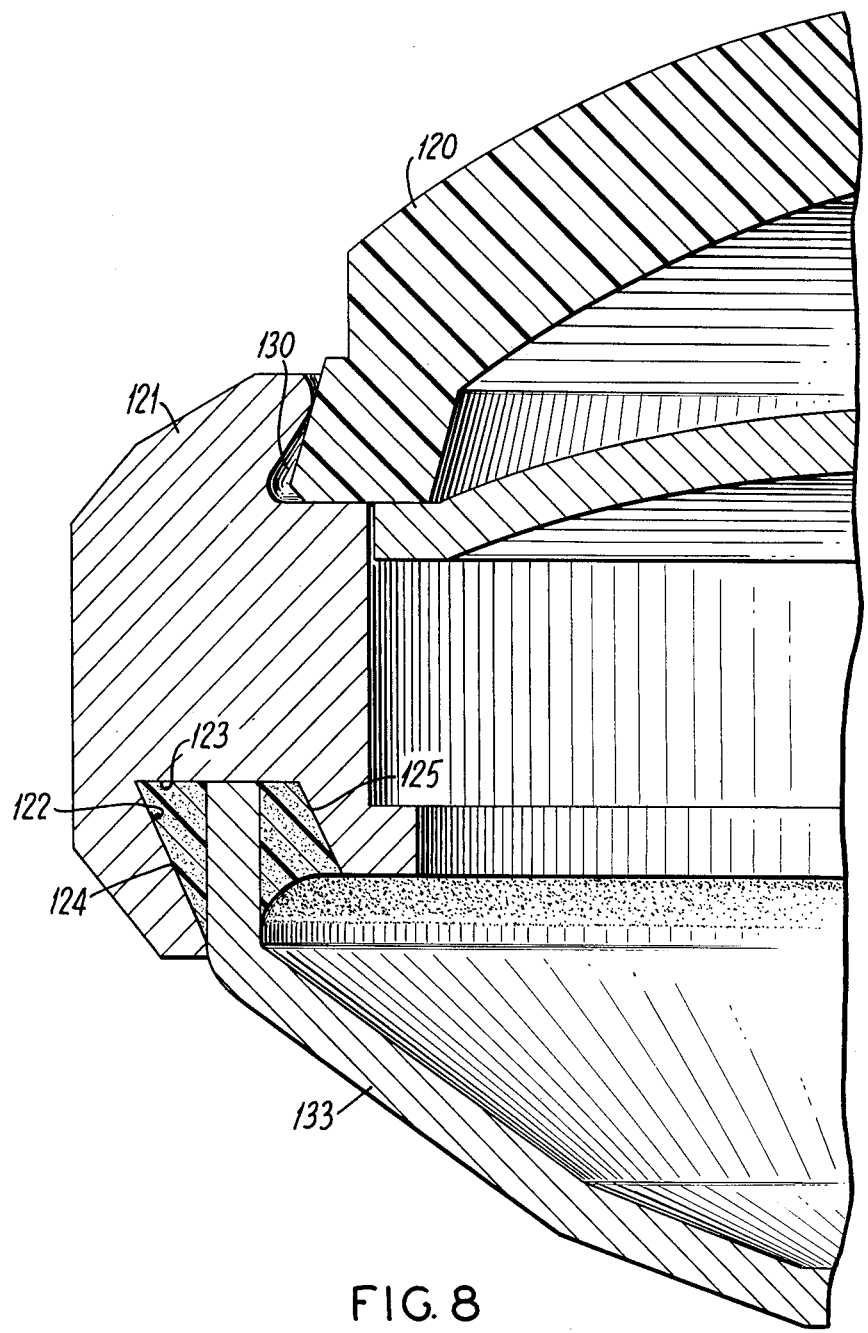
FIG. 8 is a partial cross-section of a watch case showing another embodiment of the present invention.

In FIGURE 1 the bezel 10 of the watch has a recess 11 for insertion of a watch movement (not shown). A shoulder 12 on the bezel 10 provides support for the watch movement. The dial 15 is positioned to rest on the shoulder of the bezel and is held down by the edge 16 of the crystal 20. Preferably, the crystal 20 is inserted under pressure in the ring-shaped recess 30 of bezel 10, this recess tapering at the lower part of the bezel. A back 33, having a flange 35, is secured in the groove of the bezel.

In FIGURE 2 the ring flange 35 is provided with notches 38 which aid in maintaining the flange within the groove. A metal glue 50, preferably a hardened epoxy material, fills the grove 40 in bezel 10 and occupies all the space between the walls of the groove and the flange 35. Preferably, the groove has parallel walls 41 and 43 which are oblique in relationship to the flat bottom portion of the groove 50. The oblique walls provide a breaking effect for the epoxy material under axial movement of the back, because under axial movement the back will have a tendency to be pressed against the lip 45 of bezel 10.

Other embodiments of the invention are shown in FIGURES 3 and 4 in which the bezel 100 is joined to the watch back 105 by the ring-shaped flange 107 of the back fitting into the ring-shaped groove 110 of the bezel. The term "ring-shaped" in describing the flange and the groove of the drawings herein refers to a circular watch, but it should be understood that my invention is not limited to circular watches.

In another embodiment a notch 115 (FIG. 3) is provided at the bottom closed portion of the groove 110 and an insulation gasket 118, preferably paper, is inserted into the groove 110. Gasket 118 is held between the bottom 112 of groove 110 and the flange 107, this assembly being accomplished prior to flowing of the fluid epoxy material into the groove. The watch back 105 is pressed against the thin gasket 118 to force the gasket 118 into notch 115 and at the same time centering and insulating flange 107 in the groove 110. In FIGURE 4 the groove 110 has been filled with epoxy material 50.

In the embodiment of FIGURE 5, the lower part of bezel 55 has a ring groove 56 in which the ring flange 57 of the back 58 is inserted. Ring flange 57 has two notches 60 and 62 on its outside circumference and a notch 63 on its inside circumference. These notches are located so as to be aligned opposite similar notches, respectively, 65, 66 and 67, cut into the walls of the groove 56. Epoxy material 50 fills up the space between the walls of the groove and the flange and fills up the notches as well. In FIGURE 6, back 71 is provided with flange 72 which fits within the ring groove of bezel 70. The outer circumference 74 of the flange 72 is positioned a slight distance away from the straight sided wall 75 of bezel 70. The inner circumference 76 of flange 72 is positioned at a relatively greater distance from the oblique wall 78 of bezel 70. The space of the groove is consequently greater than at its bottom (closed end) than at its open end. The wall 74 of flange 72 and also the wall 75 of bezel 70 are both provided with circular shaped recesses 80 and 82, respectively. As in previous embodiments, the groove and the shaped recesses are filled with epoxy material.

In the embodiment of FIGURE 7, back 85 with its flange 86 is inserted in the lower part of bezel 83 and the end piece of the flange 87 is bent towards the interior of the watch. The groove in this embodiment is formed so that it has two parallel walls 88 and 90 which are oblique towards the center line of the watch providing a supporting member 92 for the groove. The groove is filled with epoxy material 50 to secure the flange within the groove.

In FIGURE 8 the crystal 120 is inserted under pressure within the ring-shaped recess 130 of the bezel 121. The bezel 121 has a ring-shaped groove 122 having a flat bottom portion 123 and straight but angularly inclined parallel sides 124 and 125. The flange of the back 133 is inserted into the ring groove 122 and the groove filled with an epoxy material. It has ben found that the epoxy has sufficient strength to retain the back in the groove without the use of curved or protruding portions on the flange of the back.

The method of manufacturing the watch sub-assembly according to the present invention is to separately manufacture a bezel having a groove which follows the contour of its open back and a watch back having a protruding flange portion. Fluid epoxy material, either in its paste or its liquid state, is flowed into the groove and the flange of the back inserted into the groove. Preferably, the bezel and the back are secured together with some force, for example, by placing the bezel on a flat surface and placing a weight on the back. The epoxy material is then hardened, preferably in from 200 to 300° F. of heat, to form a solid, non-crumbly, water-tight joint having considerable shear and breakage strength.

Due to the electrically insulative properties of the epoxy material, it is possible to manufacture the watch in accordance with the present invention so as to electrically insulate the bezel from the watch back. This can be done, for example, by utilizing the gasket of FIGURE 3 or else by careful placement of the flange member in the groove. The sub-assembly thus manufactured can be subjected to an electrochemical treatment in which only one of the two metal portions of the sub-assembly would be treated. For example, the back can be gold plated in an electroplating bath by touching the inside wall of the back with an electrical conductor making the back the cathode in a gold electroplating bath. As there is no cathode current flowing to the bezel, it will not be plated which results in a saving of the plating metal.

The term "epoxy material" in this application means compounds primarily containing low pressure epoxy (ethoxyline) resins. These compounds are made by reacting diphenols or dialcohols with epichlorohydrin and amides or amines or polybasic acid anhydrides or acids. One preferred example of a resin is a solvent free ethoxyline manufactured by Ciba Ltd., Basel, Switzerland, under the name of "Araldite Adhesive 103." The hardening of the compound depends upon time and temperature; with Araldite 103 (the reaction product of diphenols or dialcohols with epichlorohydrin) and Ciba Hardener 953F (an amine) hardening of the compound is attained by heating the sub-assembly for one hour at 212° F.

I claim:

1. A watch sub-assembly comprising as an integral one-piece member a bezel having a groove, a watch back having a flange portion, and a hardened epoxy material, wherein the flange has notched portions thereon, the notched portions of the flange are adhered to the epoxy material, the notched portions of the flange and the epoxy material are in the groove, the epoxy material is adhered to the walls of the groove and substantially fills the groove, and the side walls of the groove are substantially parallel and slant inwardly to the center of the watch toward the open end of the groove.

2. A watch sub-assembly as in claim 1 wherein the flange is electrically insulated from the walls of the groove by the said epoxy material.

References Cited in the file of this patent

UNITED STATES PATENTS

| | | |
|---|---|---|
| 2,665,545 | Dinstman | Jan. 12, 1954 |
| 2,764,537 | Bunch et al. | Sept. 25, 1956 |
| 2,862,352 | Burghoff | Dec. 2, 1958 |
| 2,934,989 | Belli et al. | May 3, 1960 |
| 2,964,437 | Appleton et al. | Dec. 13, 1960 |
| 3,010,045 | Plagge et al. | Nov. 21, 1961 |